United States Patent [19]

Andersen

[11] Patent Number: 5,233,787
[45] Date of Patent: Aug. 10, 1993

[54] PILE MAT FOR THE ELIMINATION OF VERMINS ON PETS

[75] Inventor: Søren Andersen, Hornslet, Denmark
[73] Assignee: Milliken Denmark A/S, Denmark
[21] Appl. No.: 884,329
[22] Filed: May 11, 1992

Related U.S. Application Data

[63] Continuation of Ser. No. 702,317, May 20, 1991.

[30] Foreign Application Priority Data

May 21, 1990 [DK] Denmark ................................. 1251

[51] Int. Cl.⁵ .............................................. A01M 1/20
[52] U.S. Cl. .................................. 43/132.1; 119/28.5
[58] Field of Search ............................... 43/124, 132.1; 119/28.5, 156

[56] References Cited

U.S. PATENT DOCUMENTS

| | | | |
|---|---|---|---|
| 1,569,710 | 1/1926 | Burt | 119/28.5 |
| 2,315,772 | 4/1943 | Closs | 43/121 |
| 3,565,040 | 2/1971 | Pohl | 119/28.5 |
| 4,008,688 | 2/1977 | Nicholas | 119/28.5 |
| 4,688,959 | 8/1987 | Snedeker et al. | 47/1.5 |
| 4,852,517 | 8/1989 | Smith et al. | 119/156 |
| 5,002,014 | 3/1991 | Albin | 119/28.5 |

FOREIGN PATENT DOCUMENTS

| | | |
|---|---|---|
| 0275047 | 7/1988 | European Pat. Off. |
| 2608368 | 6/1988 | France . |
| 1580026 | 11/1980 | United Kingdom . |
| 2130883 | 6/1984 | United Kingdom . |
| 2150834 | 7/1985 | United Kingdom . |
| 2211387 | 7/1989 | United Kingdom . |

Primary Examiner—Mark Rosenbaum
Assistant Examiner—James Miner
Attorney, Agent, or Firm—Earle R. Marden; Terry T. Moyer

[57] ABSTRACT

A pile mat for the elimination of vermins on pets walking indoor as well as outdoor, and to which pile mat is added an insecticide which may be dispensed from the mat to the pet resting on the mat. The surface of the pile mat is impregnated with an insecticide for the dispension thereof by contact to said surface or by slow evaporation from said surface. The pile mat has a water proof backing and a napped primary texture fastened thereto, whereby the nap yarns and the primary texture have been supplied with the insecticide.

1 Claim, 1 Drawing Sheet

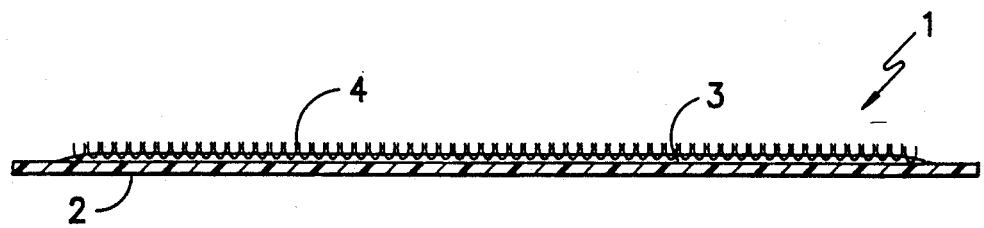
FIG. — 1 —
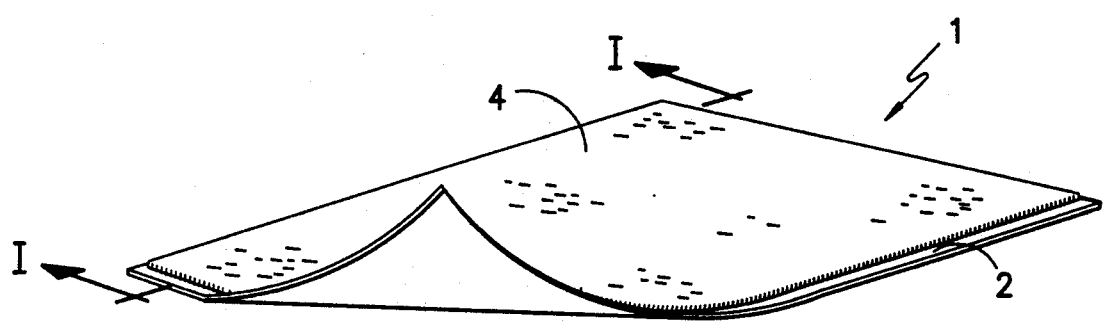
FIG. — 2 —
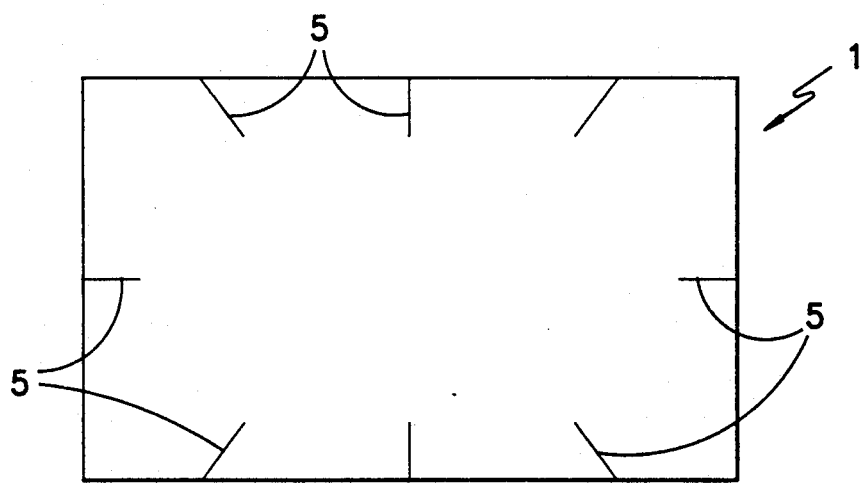
FIG. — 3 —

PILE MAT FOR THE ELIMINATION OF VERMINS ON PETS

This application is a continuation of 07/702,317 filed May 20, 1991, now abandoned.

The invention relates to a pile mat for the elimination of vermins on pets walking indoors as well as outdoors and to which pile mat is added an insecticide which may be dispensed from the mat to the pet resting on the pile mat.

It is well known to owners of such pets that the pets must be treated against vermins, in any event when the nuisance becomes to extensive that the pets or their owners are bothered by it.

From the specification of United Kingdom patent application No. 2,211,387 it is known to manufacture a pet bed in the form of a rigid molded plastic tray having inlet and outlet holes in the bottom thereof for air ventilation and for the ventilation of evaporated insecticide or other chemicals kept in a compartment below the holes in the tray bottom. Thereby the evaporated chemicals pass partly out through the air inlet holes and partly through the air outlet holes to the fur of the pet or to a bedding in the form of a pillow or a blanket, plaid or the like.

A disadvantage by this arrangement is firstly a superfluous loss of insecticide to the surroundings and secondly that the pet will be difficult to train to rest in the plastics tray without any bedding on the tray bottom. This bedding will seriously delay the evaporated insecticide in getting to the pet. Furthermore, this bedding will, each time it gets cleaned, such a lot of insecticide before some of it reaches the pet. How long this delay will last, will depend on the bedding type, thickness and of the evaporation rate of the insecticide. One can imagine that the bedding often will be replaced or cleaned before the evaporated insecticide ever has impregnated the bedding or have reached the fur of the pet. This gives a great insecurity as to whether any elimination or fight of vermins takes place.

From the specification of French patent application No. 2,608,368 is known a pile mat, the backing of which consists of open celled foam material of the latex type. The insecticide is stored in the open cells and from said cells it is dispensed by evaporation to the pet and to the surroundings, especially the bottom, when the body heat of the pet evaporates the insecticide in the foam material.

A disadvantage by this pile mat is that the insecticide, when heated up to evaporation by the pet, is dispensed to the pet as well as to the support below the foam material, and if the insecticide is liquid, said liquid may be squeezed out to the support by the body weight of the pet. Thereby some of the insecticide is lost and perhaps the support which may be a sofa, a carpet or a wooden floor, is damaged when exposed to the insecticide or other chemicals leaving the open cells at the bottom and sides of the mat backing.

To illustrate the invention to be described herein the drawing encompassing FIGS. 1-3 shows the details of the invention with:

FIG. 1 illustrating a cross-section view on line 1—1 of FIG. 2 showing a typical mat incorporating the invention;

FIG. 2 illustrates a perspective view of a typical mat encompassing the invention, and FIG. 3 showing a bottom view of the mat of FIGS. 1 and 2 illustrating a further embodiment of the invention.

It is the purpose of the invention of eliminating said disadvantages. This purpose is achieved by a pile mat 1 of the above mentioned type wherein the surface of the mat is impregnated with an insecticide to be dispensed from said surface by contact to said surface and/or by slowly evaporation from said surface, and wherein the pile mat has a water proof backing 2 and a napped primary texture 4 fastened thereto, whereby the nap yarns 3 and the primary texture 4 have been provided with the insecticide.

Thereby is achieved an efficient prevention against too large insect population on the pet all over the part of its skin on which it rests during its stay and sleep, because the insecticide is dispensed from the pile or nap by direct contact to the fur of the pet and/or by evaporation from the pile when heated by the body heat of the pet. This is obtained without having to apply an extra bedding for the pet upon the mat and without superfluous loss of insecticide to the bedding or the surroundings. Furthermore, the sleeping place of the pet is kept permanently free for living insects using prior sleeping underlays as hatching place for the next insect generation.

Since the pile 3 as well as the primary texture 4 are impregnated with the insecticide, is obtained a larger insecticide capacity and thus a longer time of use before replacement by another pile mat or cleaning and reimpregnation.

The mat nap may be e.g. a cotton nap 3, the primary texture 4 may e.g. be of materials, such as a non-woven textile material, a geotextile, a paper or natural fiber material etc., while the backing 2 may be of plastic, rubber, synthetic rubber or of a woven material which has been rendered water or liquid proof by a known technique.

A first embodiment (FIG. 3) of the pile mat 1 may have incisions 5 on suitable locations along its perimeter. Thereby is obtained an increased contact surface for the contact dispension of the insecticide to the fur of the pet, seeing that such a mat is well suited for being placed in a basket or the like concave pet bed without bothering folds or wrinkles, seeing that the pile mat can easily adapt to the bottom and inclined or upright inside walls of the bed. Pets often place themselves with their neck and back against the inner wall of the basket, and thereby a further contact area is provided between the pile mat and the neck and back of the pet which implies an increased effect of the insecticide by contact as well as by evaporation.

In another embodiment of the water proof backing layer 2 may be provided with perforations which are too narrow to permit any considerable liquid permeation when the pet is resting on the pile mat, but large enough to permit a substantial permeation of liquid flow when the pile mat of the invention is exposed to centrifugation in a washing or insecticide impregnation process. Thereby is obtained a faster and more profound and uniform impregnation of the pile mat, and simultaneously the impregnation agent is not lost by permeation through the perforations during transportation and storing and especially not during the use of the pile mat.

Examples of well suited insecticides for the pile mat according to the invention may be: Propoxur (registered trademark, Bayer AG), diazinone, 2-t-butyl-4-hydroxyanisol, 3-5-butyl-4-hydroxyanisol and an agent of the generic formula R3-Sn-Z, wherein R is a phenyl composition, and Z e.g. is a dialkyl carbamate or dialkyl(di)thiocarbamate, seeing that said agents has turned out not to be bothering, neither to the pet nor to its owner, but only to the insects, such as fleas, which are killed or have their reproduction process cut off.

I claim:

1. A pile mat large enough to act as a bed for an animal and for the elimination of vermins located on the animals using the mat as a bed comprising: a primary substrate having an upper napped surface and a liquid impervious backing material connected to the bottom of said primary substrate, said upper napped surface being impregnated with a liquid insecticide for dispersion thereof by contact and slow evaporation from said napped surface and a plurality of incisions in the perimeter surface of said backing material to allow said pet mat to be placed in a basket or concave pet bed without folds or wrinkles therein.

* * * * *